(12) United States Patent
Pennings et al.

(10) Patent No.: US 6,869,376 B2
(45) Date of Patent: Mar. 22, 2005

(54) METAL PUSH BELT AND MATERIAL THEREFOR

(75) Inventors: Bert Pennings, Goirle (NL); Hendrikus Van Den Boomen, Tilburg (NL); Arjen Brandsma, Tilburg (NL)

(73) Assignee: Van Doorne's Transmissie B.V., Tilburg (NL)

(*) Notice: Subject to any disclaimer, the term of this patent is extended or adjusted under 35 U.S.C. 154(b) by 0 days.

(21) Appl. No.: 10/100,086

(22) Filed: Mar. 19, 2002

(65) Prior Publication Data

US 2002/0132691 A1 Sep. 19, 2002

(30) Foreign Application Priority Data

Mar. 19, 2001 (EP) .......................................... 01201020

(51) Int. Cl.[7] ................................................ F16G 1/20
(52) U.S. Cl. ........................ 474/270; 156/137; 148/326
(58) Field of Search ................................. 474/269, 270, 474/271, 272; 156/137, 139; 148/326, 328

(56) References Cited

U.S. PATENT DOCUMENTS 3,949,621 A   4/1976   Beusink et al.

FOREIGN PATENT DOCUMENTS

| DE | 100 10 383 A 1 | 9/2000 | |
|---|---|---|---|
| EP | 0181670 | 5/1986 | |
| EP | 0 931 844 A1 | 7/1999 | |
| EP | 0 950 830 A1 | 10/1999 | |
| EP | 11293407 | 10/1999 | |
| EP | 0935007 | 10/2000 | |
| JP | 62-155352 A | * 12/1985 | ............. F16G/5/16 |

* cited by examiner

Primary Examiner—David A. Bucci
Assistant Examiner—Bradley J. Van Pelt
(74) Attorney, Agent, or Firm—Young & Thompson

(57) ABSTRACT

A metal push belt (1) for application in a continuous variable transmission, includes at least one endless tensile member (2), and transverse elements being provided freely moveable in the endless direction of the tensile member (2). The tensile member is produced of steel, containing non-metallic inclusions of predetermined sizes as observed in the microstructure of a material section, in accordance with a specified diameter $D_{circle}$ of a circle relating to the surface occupation of such an inclusion observed in such micro structure, in which the steel is produced in a constitution having a nominal inclusion size distribution with diameters ranging up to 30 $\mu$m, the inclusion diameter range between 10 $\mu$m and 30 $\mu$m being less than 20% of the total number of inclusions per square unit of sliced material counted by inclusions having a size larger than 2 $\mu$m.

20 Claims, 2 Drawing Sheets

METAL PUSH BELT AND MATERIAL THEREFOR

BACKGROUND OF THE INVENTION

The present invention relates to a metal belt for continuously variable transmissions as described below and to a material for such belt.

DESCRIPTION OF THE RELATED ART

A belt for a continuous variable transmission is generally known, e.g. from EP-A0181670 or from U.S. Pat. No. 3,949,621. The belt comprises at least one endless metal band, preferably provided in a set of generally conforming nested bands, at least partly being surrounded by transverse elements for at least clamping the belt in between the sheaves of a set of pulleys.

The bands of this known construction have a flat, generally rectangular cross section. Due to its nature of use in continuously variable transmissions, the known belt is during operation subjected to extremely high stresses varying in height with the radius of bending and with the belt speed and moment transmitted or the pull force in a band, i.e. the tensile means of the belt, resulting there from. For this reason avoidance of breakage of the belt during the service life of a belt, i.e. the transmission and vehicle wherein it is to be applied, is a main point of consideration with such belts, in particular with the bands of a belt.

One manner of prolonging service lifetime is to shape and form the bands in a favourable manner. One such forming measure is known from European patent publication EP-B-181670. This document teaches to provide permanent compression stresses in the central part and the edge part of the contact faces of the bands of the belt, thus resulting in a reduction of the level of local tensile stress. The publication also teaches to deform the edge zones into a confined shape so as to reduce tensile stresses occurring from bending in said edge zone, so as to largely avoid breakage caused by hairline cracks occurring from the edges. An example of such a forming measure is known from EP-A-0950830.

Another manner of prolonging service lifetime is to improve the quality of the base material used for producing the bands forming the tensile means. Various types of steel, produced by base material suppliers as a special mixture of several metal elements are known, e.g. from EP-A-0935007 and EP-A-0931884. Some of such base materials are better adapted for application in a band than others. A major influence on the fatigue strength of such base material is known to be the amount of particles present in the material, alternatively denoted inclusions. Such inclusions form during the production of the material as a result of specific reactions between certain components of the base material forming chemical bonds there between. They are recognisable as a kind of particles within the otherwise evenly and ultimately fine-grained structure of the base material. For example in maraging steel the inclusions may be formed between the elements Nitrogen, usually denoted by the character N, and Titanium, usually denoted as Ti, and are referred to as TiN-inclusions. Another example of an inclusion type is between Ti and carbon, denoted as C, referred to as TiC-inclusions.

From standardised fatigue testing methods of the field of materials research, it is known that such particles affect the fatigue durability of materials. Examples of such standard testing methods include the cyclic tensile loading of a piece of base material, a cyclic bending thereof, and the exertion of a rotating bending moment thereon. The reduction in fatigue strength of the base material is e.g. explained through a splitting effect an inclusion is supposed to have on the structure of surrounding material, alternatively denoted the matrix, increasing local tension in the materials matrix, which eventually leads to local failure of the material structure, gradually further affecting the surrounding structure until sudden failure of the piece of material.

From the prior art document documenting material research by SKF—"Microstructural changes during rolling contact fatigue"; Jan. 8, 1997; Thesis by Voskamp—it is known, based on a so-called rotating beam test, that reducing the probability of presence of relatively large size inclusions resulted in a significant improvement in the fatigue life of bearing steel (p.25). It is also known therefrom that inclusions are non-metallic particles. Therefor the probability for failure to occur under constant cyclic stress amplitude is related to the presence of such particles in a loaded volume. A high quality steel example is provided, with significant percentages of frequency distribution in size classes between 30 and 60 microns. A steel type with such particle distribution, however, is in accordance with the present invention found to be unsuitable in terms of fatigue durability for application in a push belt.

A publication further addressing this issue of inclusions in a steel and claiming a suitability for application in a steel push belt, is JP-11293407. According to this publication, the fatigue strength of steel can be sharply improved, in particular for application in belts for stepless transmissions, by setting the sizes and diameter ratios of TiN-inclusions in maraging steel. The measure prescribed includes that the diameter Dmax of a circle circumscribed to inclusions observed in a cross section in the micro-structure of the metal which constitutes a steel belt is below 8 microns. The diameter of a circle inscribed to the inclusions is specified as Dmin. The ratio Dmin/Dmax of the group of inclusions with Dmax ranging from 2–8 micron further according to this disclosure being required to be 0.75 or more.

SUMMARY OF THE INVENTION

Although the prescription from the latter publication undisputedly leads to an improved fatigue durability of steel, it is by the present invention found to be unduly strict for application in the field of push belts, and thereby unnecessarily expensive and complicated in production. The invention therefor aims at providing a material prescription for steel, in particular optimised for use in a push belt however without the pre-mentioned disadvantages, at least a prescription reducing the disadvantageous effects, preferably addressing a specific material fatigue requirement relating to a required at least virtually infinite number of revolutions to pass in a belt's life time.

In accordance with the invention the features disclosed below achieve this. In accordance with the idea underlying the invention, this prescription is achieved by replacing the standard fatigue test of base material producers by an application based fatigue test incorporating the experience of the application of steel at the development and production of push belts and the process therefor. In this manner the fatigue durability is not attained by testing the material per se, rather it is attained by a test in which the specific material treatments required for achieving a push belt's band are taken account of in the test, and in which test are also incorporated the interaction of such tensile means with its environment in the push belt, and finally, it takes account of the exact and typical manner in which a tensile means is subjected to cyclically varying stresses when loaded during operation in a transmission.

In accordance with the latter approach according to the invention it was found that the critical process determining the life time of steel as effectively incorporated in a steel belt for CVT include the numerous amount of times of bending and stretching of the steel bands at rotating in a transmission, combined with stresses due to e.g. pressure contacts and relative movements of the bands mutually, and the tensile loading of the bands. An additional amount of stress is taken into consideration due to the bending of the belt when entering the circular trajectory in a pulley. Subsequent stretching of a band occurs when the band exits a pulley for crossing towards the other pulley in a straight trajectory part in between the pulleys. In the bent trajectory of a tensile means, the innermost and outermost band are not only loaded by a mutual band-band contact, but additionally loaded by friction with and Hertzian stress from contacting the saddle and ear respectively of the transverse elements. This led to the conclusion that the setting of a desired level of fatigue strength of a band can be addressed by influencing the material features per se. This differs from setting a nominal tensile strength of a band to a desired level, which can be done by relating the specific tensile strength of the belt material to the dimensions of the cross section of the belt.

From microscopic research it was found that the earlier mentioned local disruption in the material structure subsequently forms an initiation for material tearing, i.e. material crack, so that failure of a band occurs, i.e. is initiated invisibly by an inside factor rather than from an outside factor. Based on this insight various fatigue tests have been conducted under dynamic, i.e. rotating conditions, in particular with complete belt/pulley tests, showing that a good result in fatigue strength, related to the number and size distribution of inclusions is achieved as discussed below.

It was herewith favourably found that the steel could be produced according to a less strict prescription than the known prescription while still meeting the requirements prescribed by the actual application and use thereof in a push belt. Rather than when departing from the standardised fatigue tests from the field of materials it was thus found that the steel for push belts might be produced in a grade less expensive and complicated to produce than the material known from the prior art.

In the particular cases of a steel type which is known for high tensile strength in combination with high fatigue durability, such as in case of maraging steel, it was found that the material prescription could even be less harsh in that no account needed be taken from inclusion sizes below 5 micron. Yet the percentage of inclusion sizes between 10 and 30 should remain below 10%. Thus the present invention also relates to a metal push belt for application in a continuous variable transmission, comprising at least one endless tensile means preferably provided in a set of nested endless bands, at least partly being surrounded by transverse elements for at least clamping the belt in between the sheaves of a set of pulleys of such continuous variable transmission, the transverse elements being provided freely moveable in the endless direction of the tensile means, the tensile means being produced of steel, containing non-metallic inclusions of predetermined sizes as observed in the micro-structure of a material section, in accordance with a specified diameter $D_{circle}$ of a circle relating to the surface occupation of such an inclusion observed in such micro structure, characterised in that the steel is produced in a constitution having a nominal particle size distribution with diameters ranging up to 30 μm, the inclusion diameter range between 10 μm and 30 μm being less than 10% of the total number of inclusions per square unit of sliced material counted by particles having a size larger than 5 μm. In this respect it is remarked that the art of metallurgy provides the methods for influencing such particle size distributions, which are generally known.

A further improvement of the drive belt is according to the invention found in that the total number of inclusions is set less than 200 per 100 mm$^2$ preferably less than 100 per 100 mm$^2$, while in a further elaboration of the setting of inclusion sizes of the belt material, the inclusions with a diameter within the range from 20–30 μm make up less than 1% from the total amount of inclusions per square area.

According to a particular aspect of the current invention, account has been taken from the circumstance where a band of the tensile means is produced with a hardened surface layer, preferably a gas nitrided surface layer. It was acknowledged by the idea underlying the invention that such additional treatment of a material positively contributes to the fatigue durability of a tensile means. This finding, in addition to the finding that transmission based testing provides more realistic fatigue durability values than standard fatigue testing methods, supports the validity of the favourable though quite specific range of steel prescriptions according to the invention.

More in particular it was found that in fact the area within a belt requiring the demanding prescription may be limited to a band-like area of a thickness smaller than 0.25 times the thickness of the relevant endless band, preferably of a thickness being 0.2 times the band thickness, and starting at a distance from a radial face at a depth half way the nitrided surface layer. This area is identified being a transition area between the hardened surface layer and the relatively softer core of the belt, and to be most critical in fatigue durability. This means that the core of a steel band may contain an inclusion size distribution, which is less strict than the prescription for the material in the identified transition area.

In the particular case a steel such as maraging steel contains inclusions that are composed of Ti and N, the amount of Ti by material weight should according to the invention remain within the range from 0.3% to 1%. Further, the invention in particular relates to a belt of which the material is fatigue tested by fatigue loading of such belt type within a transmission.

BRIEF DESCRIPTION OF THE DRAWINGS

The invention will now further be explained by way of examples given in the accompanying drawing wherein.

DESCRIPTION OF THE PREFERRED EMBODIMENTS

Figure 1:
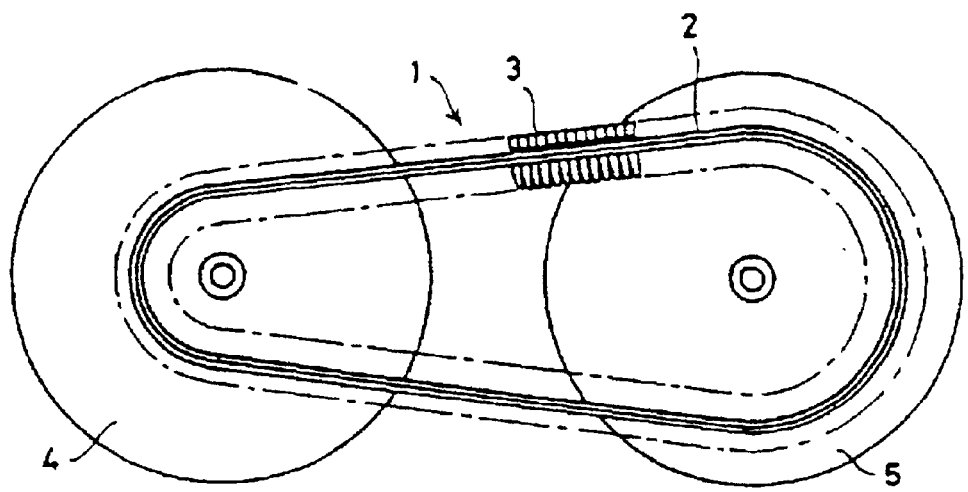
FIG. 1 is a schematic illustration of the belt the present invention relates to and of the transmission to which such belt design relates.

FIG. 1 shows schematically a continuous variable transmission (CVT) with a conveyor belt 1 which is made up of a tensile means 2 in the form of nested endless thin bands, and on which there are an endless continuous series of cross elements 3, alternatively denoted transverse elements, which slide freely there over. They move between the sheaves of pulleys 4 and 5, with steplessly variable diameter. Such a continuous variable transmission is known per se. Typical thickness of a band range from 0.15 to 0.25 mm. Typical widths of a band range from 8 to 35 millimeters. Typical circumferential lengths of a drive belt 1 range from 50 to 100 cm. For reasons of economical production and for preventing technical complexity, a belt usually runs between pulleys 4, 5 of which only one sheaf is arranged axially movable, while the other is arranged rotationally and axially fixed to an axle of rotation. This arrangement means that during operation the alignment of a belt 1 and its bands 2 deviates from the ideal position orthogonal to the axles of rotation. For coping with this "miss-alignment" the contact face of the transverse elements against which an inner band rests is provided with a slightly convex curvature.

Figure 2:
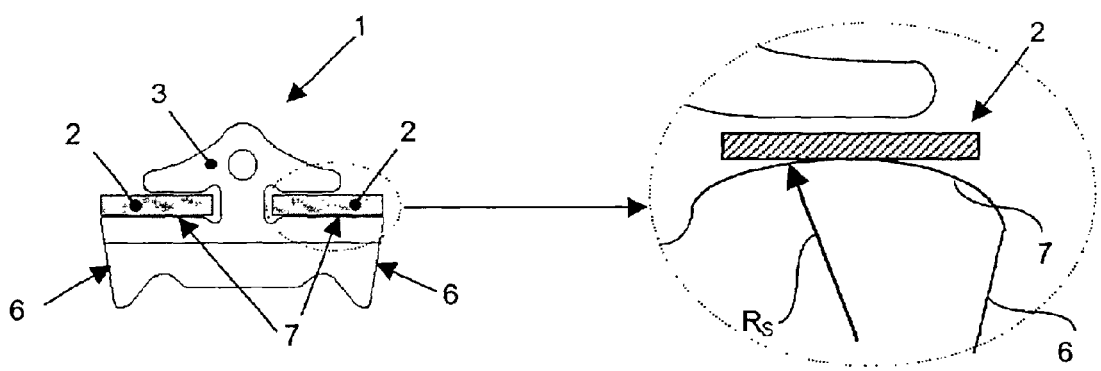
FIG. 2 is an illustration of the manner in which a tensile element and a transverse element are mutually oriented within a belt and of the interaction there between. The figure includes an enlargement of the arrangement of interaction between a band and a saddle.

FIG. 2 depicts a front view of a transverse element 3 and a cross section of a tensile means 2. The cross element 3 laterally shows a flange 6 by which it rests against the conical face of one sheaf of either a drive or a driven pulley. By varying a pinching force exerted on the cross element 3 by a relevant pulley, the element may be urged radial outwardly or otherwise may move radial inwardly when the pinching force of the pulley is reduced in favour of the pinching force of the other pulley of the transmission. At such action and under the normal pinching force for keeping the belt in a particular transmission ratio, the tensile means is set under a certain tension, thereby performing a function in preventing the transverse elements from splashing apart. This function is performed by contacting a radial outwardly directed contact face, alternatively denoted saddle 7, of the cross element 3, with a principal inward facing side of the inner band of the tensile means. The saddle is shaped slightly convex so as to promote a centred tracking of the tensile means 2 over said saddle during the numerous number of revolutions a belt undergoes at transmitting power from one pulley to the other. The convexity circumscribes an imaginary circle with a radius Rs of a typical size in the range from 0.1 to 1 meter. To the upper side of a tensile means, above the element saddle the tensile means is kept into position by a so-called element ear part. The upper band of the tensile means and the ear part may contact at a belt part exiting from a pulley.

The bands of a tensile means 2 are produced of high quality steel, e.g. maraging steel. As such, such steel is unsuitable for use in a band, even when having the correct shape and dimensions. For this reason specific base material treating processes have been developed. According to a preferred process, the base material is brought into a band shape, preferably pre-stretched to a pre-defined level by a combination of bending and stretching while in band shape and under rotating conditions, hardened by heat treatment and subsequently surface hardened, here preferably under gas nitriding conditions. In this manner a band is provided with an additionally hardened surface layer providing a compressive stress which compensates for local tension stress, endures mutual contacts and multiple cross elements contacts in said contact faces, while still the pre-tensioned bands maintain a relatively softer core, required for undergoing a virtually infinite number of revolutions in a curved state.

It is by the current invention appreciated that a steel band of such final condition, requires a different base material than untreated base steel either or not made suitable for application in steel belts. In particular the invention recognises a difference in material prescriptions based on standardised tests for fatigue durability on the one hand, and material prescriptions based on tests taking account of actual fatigue loads on a belt. In other words, rather than generally prescribing a steel condition particularly suitable for steel belt application as known in the art and based on standardised tests, the current invention takes account of realistic operating conditions for a treated steel, and on the basis thereof provides for a generally less strict steel prescription proven to be suitable for belt application, resulting in a cheaper material, and less complex to produce. In the present context the term prescription is alternatively, be it perhaps less accurate, denoted material composition or material description.

For arriving at such favorable prescription, the invention departs from a testing method developed for determining the fatigue strength of this steel in realistic conditions of operation. The belts are in this testing method run on a test rig reassembling a transmission actually used in a vehicle, i.e. comprising a set of pulleys and actuating and control means. The belt tests are performed in a fixed overdrive (OD) ratio so as to test the belt in a most demanding state, with a fixed, relatively high primary torque, and with a fixed maximum speed. Such test settings are so-called overload settings. The belt durability is determined until belt failure occurs, taking into account that the durability time at overload conditions corresponds to a statistically derived much longer durability time under normal operating conditions. Those failure causes due to initiations by inclusions are studied by means of fracture analysis. Subsequently the inclusion size distribution is determined of those bands (rings) that failed by fatigue, initiated by an inclusion. These belt durability results are plotted against the inclusion size distribution.

Measurement of inclusion size distributions is performed on bands, i.e. when the steel is in its final form, i.e. has become an end product. In the measurement method here and preferably used for supporting the invention, the specimen surface is polished, where after it is placed under an optical microscope. A predefined area to be measured is selected, and the 'projections' of all the inclusions present in the selected area are measured. From these inclusion projections diameters $D_{circle}$ are calculated corresponding to circles with an equivalent surface area as the projections. The inclusion projections are than be classified in several ranges of $D_{circle}$. For example $D_{circle}$ is classified in classes of 5–10 μm, 10–15, 15–20 μm, 20–25, 25–30 μm and over 30 μm.

The area to be measured is preferably being set larger than 100 mm². A larger area in this range provides a more realistic value for the inclusion size distribution to be determined. Instead of $D_{circle}$, in principle also a $D_{max}$ can be taken from the measured projections. This $D_{max}$ is the maximum 'size' of the measured projections, e.g. the diagonal of a square projection thereof.

Figure 3:
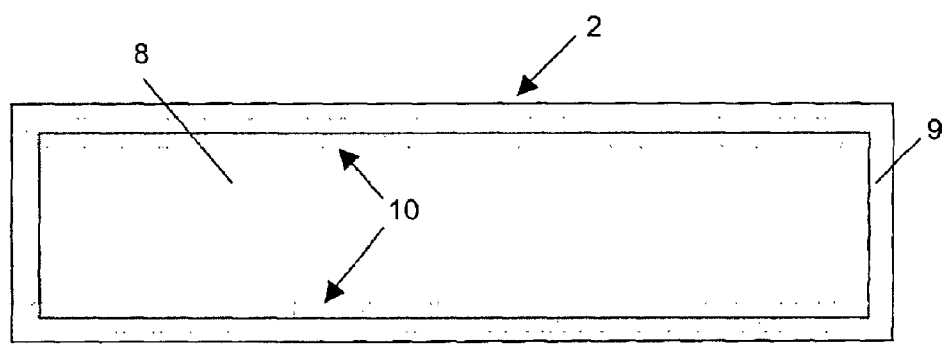
FIG. 3 schematically represents a macroscopic view of the cross section of one endless tensile band, including an indication of the area within a tensile band where initiations of fatigue failures are found concentrated.

FIG. 3 schematically represents a detailed cross section of a band 2, i.e. taken transverse to the longitudinal or endless direction of the belt. From the figure it may be taken that a band after being formed from base steel and after being treated as described above, shows an outer layer 9, characterised by its increased hardness relative to the hardness of material of the core 8 of the band. The increased hardness is achieved by incorporation of nitrogen in the material matrix through a gas nitriding treatment of the band 2. The layer typically has a nominal thickness of a value within the range from 10 to 40 micrometers. Immediately bordering this hardened layer 9, at the inside and the outside face of a band, a failure initiation zone 10 of a thickness up to 30 micron is recognised by the research underlying the present invention. In this area an increased level of fatigue failure is in practice recognised, i.e. the initiation thereof, which at microscopic inspection may be distinguished from residual failure areas, which occur around the initiation area after the initial fatigue area has grown to a threshold level beyond which the band can no longer transmit the load imposed on the band during operation. The location of this zone 10 is in accordance with the invention explained by the change in mechanical properties of the band in the area of transition from the hardened layer 9 to the relatively softer core 8 of the band. It does not necessarily mean that the load imposed on the band is highest in this zone. Rather, the combination of external load and the material characteristics of the band and its residual stress distribution, determine where the band will start to fail. The zone is observed near an inner and near an outer face of a band. The zone, at the transition from the hardened surface layer to the relatively softer core 8, affected by the combination of alternating tensile load on the band, the alternating bending and stretching of the band, internal stresses and the Hertzian and frictional contact of an inner and outer band of a tensile means with the relevant part of transverse elements 1, or mutually between the bands. This zone 10 in a band, being recognised as the "weakest spot", indicates that only part of a band is critical for fatigue failure of a band. It is in accordance with the invention thus recognised that the cause of failure of a band is a combination of external factors acting on a band, the material characteristic and internal stress of a band. This outcome further explains why the known material prescription for steel for push belt application may be considered unduly harsh. In the following a technically correctly performing and cost-wise favorable material prescription is provided, based on practice belt tests underlying the present invention.

Figure 4:
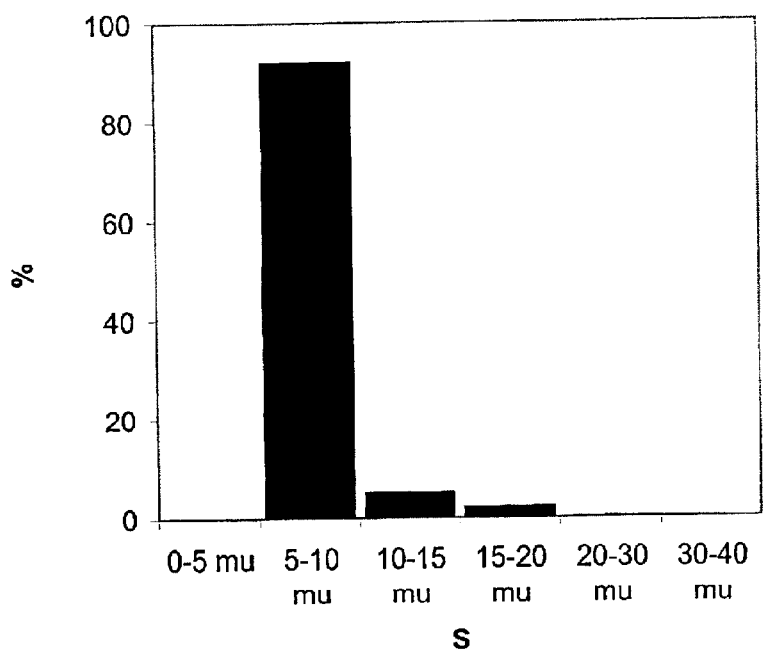
FIG. 4 is a plot indicating a particle distribution meeting the prescription according to the invention.

FIG. 4 represents an example of a distribution of sizes of inclusions in a base steel which renders positive results in minimising if not obviating belt failures caused by metal fatigue. The distribution here prescribed directly relates to the material requirements of a push belt for CVT since the prescription is derived from practice tests described above with a belt being tested in operating conditions. At the Y-axis is represented the percentage of inclusions in a particular class S of inclusion sizes represented along the X-axis, related to the total number of inclusions counted as from inclusions with a certain predetermined minimal size. With a sufficient level of fatigue strength for the push belt, it was found that the predefined sizes of inclusions may safely range up to 30 micron, be it that the majority of inclusions, i.e. at least 90% being found in the size ranging from 5–10 micron. Such a distribution at least largely follows the natural distribution of particle sizes found in several steel types as e.g. represented by FIG. 10 of the prior art SKF research document. In an extremely harsh material prescription, e.g. all particles being of a size smaller than 10 micron, a comparable shape of distribution may be expected to be found, however shifted to the left side in the figure. In the current example figure, a nominal total number of 343 inclusions per 100 mm² was found, with nominally 317 in the size range from 5–10 micron, 18.2 in the size range 10–15 micron, 7.5 in the size range 15–20 micron, and 0.7 in the size range from 20–30 micron, the latter class having two classes from 5 micron combined.

Taking into account a standard deviation of over 54 at comparable measurements as in FIG. 4, a safe material prescription was found with the inclusions occurring up to a size of 30 micron, provided the percentage of inclusions having a size larger than 10 um is less than 10%. On the bases of this finding an alternative, more general prescription is deducted taking into account particle sizes as from 2 micron, in which case the percentage of particles larger than 30 micron should be less than 20%.

Figure 5:
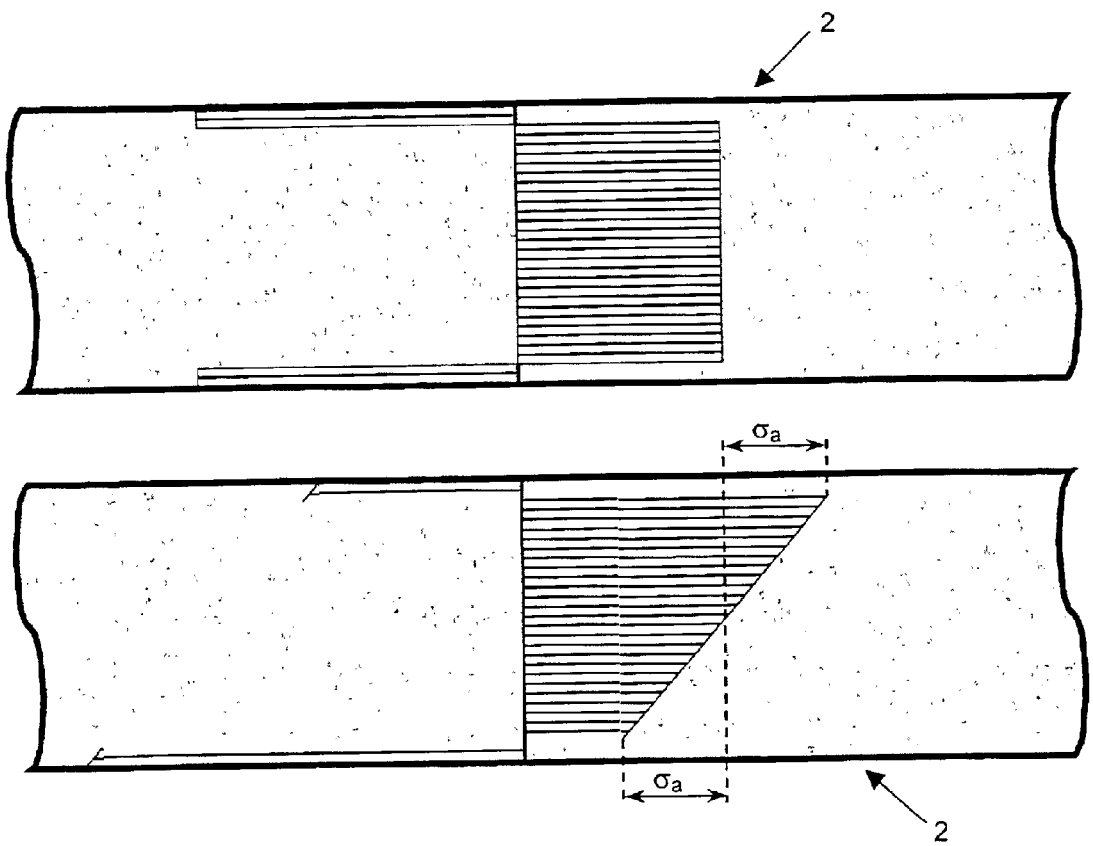
FIG. 5 is a representation of internal stress loads of a surface hardened band and the effect thereon at bending (the lower band) and stretching (the upper band) respectively.

FIG. 5 by a longitudinal section over the height of the band illustrates the effect of the hardened, i.e. pre-compressed surface layer 9 on the internal tensions, represented by parallel lines at several discrete levels within the band. It may be seen that in the relatively softer core, at tensile loading of the belt, the internal tensions reach a certain, positive level, whereas in the hardened surface layer, the tensions, due to the pre-compression, remain at a negative level. In the stretched state of the band as in the upper depicted band section, the tension within the core is equal over the bands height, and also the tension in the pre-compressed surface layers are equal. When in bent state, as in the lower depicted band section, the tension increases near the upper face of the band due to tensile loading, while near the lower side a compression tension occurs due to the bending phenomena. This is superimposed on the tensile loading of the band as in stretched state, and superimposed on a possible residual stress as may deliberately be caused by a pre-stretching bending process step during production of a band. Near the upper side of a band the tension in the surface layer approaches the zero tension level, while to the lower side the tension becomes larger in the negative direction. Thus in accordance with the current invention the found concentration area 10 of failure initiations is explained through the relatively large amplitude differences, represented by "$\sigma_a$", in internal tension stress, in particular at the cyclically reoccurring bent state of a band. The model of FIG. 5 explains both why a failure may also be found at bands other than the innermost or outermost of a set of bands in a push belt. In case of the innermost and outermost bands, which most frequently fail relative to the other bands, an additional tensile loading of the relevant band by friction with a saddle or an element ear part, and by Hertzian stress, in particular in the bent state appears most critical. FIG. 5 may also be used to illustrate the effect of difference in hardness between surface layer 9 and core 8 of a band. The difference in hardness implies a difference in resistance to deformation, i.e. to and back from a bent state, which is presumed to add to the criticality of the transition area between surface and core of a band.

The present invention, apart from the above description and all details of the pertaining drawing, further relates to the features provided by the following claims.

What is claimed is:

1. Metal push belt (1) for application in a continuous variable transmission, comprising at least one endless tensile means (2) provided with at least one endless band, at least partly being surrounded by transverse elements (3) for at least clamping the belt (1) in between sheaves of a set of pulleys (4, 5) of such continuous variable transmission, the transverse elements being provided freely moveable in the endless direction of the tensile means (2), the endless band being produced of steel, the steel containing inclusions of predetermined sizes as observed in the micro-structure of a material section, in accordance with a specified diameter ($D_{circle}$) of a circle relating to the surface occupation of such an inclusion observed in such micro structure, wherein:

the steel is produced in a constitution having a nominal inclusion size distribution with diameters ranging up to 30 μm, an inclusion diameter range between 10 μm and 30 μm is less than 20% of the total number of inclusions per square unit of sliced material, and the inclusions are counted by counting only inclusions having a size larger than 2 μm.

2. Drive belt (1) according to claim 1, characterised in that the total number of inclusions being less than 200 per 100 mm².

3. Drive belt according to claim 1, characterised in that the inclusions with a diameter within the range from 20–30 μm make up less than 1% from the total amount of inclusions per square area.

4. Drive belt according to claim 1, characterised in that the inclusion diameter range between 10 and 30 micron makes up less than 5% of the total number of inclusions per square unit.

5. Drive belt (1) according to claim 1, characterised in that the inclusions are composed of Ti and N.

6. Drive belt (1) according to claim 1, characterised in that by material weight AN amount of Ti lies within the range from 0.3% to 1%.

7. Metal push belt according to claim 1, wherein,
the inclusion diameter range between 10 μm and 30 μm is less than 10% of the total number of inclusions per square unit of sliced material, with only inclusions having a size larger than 5 μm being counted.

8. Drive belt according to claim 7, wherein the inclusions with a diameter within the range from 20–30 μm make up less than 1% from the total amount of inclusions per square area.

9. Drive belt according to claim 1, wherein the total number of inclusions is less 100 per 100 mm².

10. Drive belt according to claim 1, wherein,
the endless band comprises a gas nitrided hardened surface layer on an inner core, and
the inclusion size distribution is measured at a measuring area including an interface between the inner core and the nitrided surface layer.

11. Drive belt according to claim 10, wherein,
the measuring area occupies a thickness of the endless band smaller than 0.25 times a total thickness of the endless band, and
the measuring area starts at a distance, from a radial face of the endless band, at a depth half way through the nitrided surface layer.

12. Drive belt according to claim 1, wherein,
the endless band comprises a gas nitrided hardened surface layer on an inner core, and
the inclusion size distribution is measured at a measuring area occupying a thickness of the endless band smaller than 0.25 times a total thickness of the endless band, and
the measuring area starts at a distance, from a radial face of the endless band, at a depth half way through the nitrided surface layer.

13. Drive belt according to claim 1, wherein,
the inclusion size distribution is measured after the endless band has been test run on a test rig simulating a vehicle transmission, the test rig comprising a set of pulleys and an actuating and control means,
the test run is performed in an overload setting until the endless band fails,
a polished surface area of the endless band is measured for inclusion projections, and
from the measured inclusion projections, diameters ($D_{circle}$) are calculated corresponding to circles with an equivalent surface area as the projections.

14. Metal push belt (1), for application in a continuous variable transmission, comprising at least one endless tensile means (2), provided with at least one endless band, at least partly being surrounded by transverse elements (3) for at least clamping the belt (1) in between sheaves of a set of pulleys (4, 5) of such continuous variable transmission, the transverse elements being provided freely moveable in the endless direction of the tensile means (2), the endless band being produced of steel, the steel containing inclusions of predetermined sizes as observed in the micro-structure of a material section, in accordance with a specified diameter ($D_{circle}$) of a circle relating to the surface occupation of such an inclusion observed in such micro structure, wherein, the steel is produced in a constitution having a nominal inclusion size distribution with diameters ranging up to 30 μm, an inclusion diameter range between 10 μm and 30 μm is less than 10% of the total number of inclusions per square unit of sliced material, and the inclusions are counted by counting only inclusions having a size larger than 5 μm.

15. Steel, in particular maraging steel, for use in a push belt, produced in accordance with the prescription according to claim 14.

16. Drive belt (1) according to claim 14, characterised in that the total number of inclusions being less than 200 per 100 mm².

17. Drive belt (1) according to claim 16, characterised in that the total number of inclusions being less than 100 per 100 mm².

18. Drive belt according to claim 14, characterised in that the inclusion diameter range between 10 and 30 micron makes up less than 5% of the total number of inclusions per square unit.

19. Metal push belt (1) for application in a continuous variable transmission, comprising at least one endless tensile means (2) with at least one endless band, at least partly being surrounded by transverse elements (3) for at least clamping the belt (1) in between sheaves of a set of pulleys (4, 5) of such continuous variable transmission, the transverse elements being provided freely moveable in the endless direction of the tensile means (2), the endless band being produced of steel, the steel containing inclusions of predetermined sizes as observed in the micro-structure of a material section, in accordance with a specified diameter ($D_{circle}$) of a circle relating to the surface occupation of such an inclusion observed in such micro structure, wherein, the steel is produced in a constitution having a nominal inclusion size distribution with diameters ranging up to 30 μm, an inclusion diameter range between 10 μm and 30 μm is less than 20% of the total number of inclusions per square unit of sliced material, and the inclusions are counted by counting only inclusions having a size larger than 2 μm, and the endless band of the tensile means comprises a gas nitrided hardened surface layer on an inner core.

20. Drive belt (1) according to claim 19, wherein the inclusion size distribution is measured at an area including an interface between the inner core and the nitrided surface layer, the area of a thickness smaller than 0.25 times the thickness of the endless band and starting at a distance, from a radial face of the endless band, at a depth half way through the nitrided surface layer.

* * * * *